(12) United States Patent
Nowicki

(10) Patent No.: US 8,468,904 B2
(45) Date of Patent: Jun. 25, 2013

(54) TORQUE-HANDLING GEAR WITH TEETH MOUNTED ON FLEXIBLE ARMS

(75) Inventor: Andrew Nowicki, Pruszkow (PL)

(73) Assignee: Andrew Nowicki, Pruszkow (PL)

( * ) Notice: Subject to any disclaimer, the term of this patent is extended or adjusted under 35 U.S.C. 154(b) by 15 days.

(21) Appl. No.: 12/921,691

(22) PCT Filed: Mar. 9, 2009

(86) PCT No.: PCT/US2009/036553
§ 371 (c)(1),
(2), (4) Date: Dec. 7, 2010

(87) PCT Pub. No.: WO2009/114477
PCT Pub. Date: Sep. 17, 2009

(65) Prior Publication Data
US 2011/0079098 A1    Apr. 7, 2011

Related U.S. Application Data

(60) Provisional application No. 61/035,055, filed on Mar. 10, 2008.

(51) Int. Cl.
*F16H 55/17*    (2006.01)
(52) U.S. Cl.
USPC ................................. 74/461; 74/437; 74/411
(58) Field of Classification Search
USPC .................... 74/411, 409, 461, 468; 475/331, 475/344, 347
See application file for complete search history.

(56) References Cited

U.S. PATENT DOCUMENTS

| 633,470 A | 9/1899 | McCormick | |
|---|---|---|---|
| 1,460,661 A * | 7/1923 | De Coninck | 74/461 |
| 1,772,986 A * | 8/1930 | Dunham | 74/461 |
| 2,212,692 A * | 8/1940 | Kitchens | 74/461 |
| 3,098,300 A | 7/1963 | Gustav | |
| 3,122,928 A * | 3/1964 | Paterson | 74/2 |

(Continued)

FOREIGN PATENT DOCUMENTS

FR            401987 A        9/1909

OTHER PUBLICATIONS

"European Application Serial No. 09719238.9 , Extended European Search mailed Jun. 28, 2011", 6 pgs.

(Continued)

*Primary Examiner* — Troy Chambers
*Assistant Examiner* — Valentin Craciun
(74) *Attorney, Agent, or Firm* — Schwegman Lundberg & Woessner, P.A.

(57) ABSTRACT

First gear for use in a gear set including a second gear has a hub to which are attached a plurality of arms made of an elastic material. Each pair of adjacent arms defines a slot between them into which the arms may bend. The arms can deflect elastically in the plane as a cantilevered beam. Each arm has on the end thereof, a tooth for meshing with a tooth on the second gear to allow transfer of force between the first gear's tooth and the meshing second gear's tooth. A load distributor in contact with at least first and second arms distributes to the second arm at least a portion of force received by the first arm's tooth while the first arm's tooth meshes with a tooth on the second gear. In one embodiment, the load distributor comprises an insert within the slot between the first and second arms.

23 Claims, 13 Drawing Sheets

U.S. PATENT DOCUMENTS

| | | | | |
|---|---|---|---|---|
| 3,496,802 A * | 2/1970 | Arnold et al. | | 475/180 |
| 3,633,441 A * | 1/1972 | Hicks | | 475/334 |
| 3,636,792 A * | 1/1972 | Vigh | | 74/461 |
| 3,887,979 A * | 6/1975 | Kamiya | | 29/893.32 |
| 3,921,784 A * | 11/1975 | Orlens | | 400/174 |
| 3,926,067 A * | 12/1975 | Blanchard et al. | | 74/461 |
| 4,127,041 A * | 11/1978 | Imazaike | | 74/411 |
| 4,359,912 A | 11/1982 | Small | | |
| 4,437,356 A * | 3/1984 | Imazaike | | 74/411 |
| 5,596,905 A * | 1/1997 | Kurosawa | | 74/443 |
| 6,134,786 A * | 10/2000 | Graupner et al. | | 29/893.35 |
| 6,440,044 B1 | 8/2002 | Francis et al. | | |
| 6,508,140 B2 | 1/2003 | Zaps | | |
| 6,601,467 B1 * | 8/2003 | Futterer | | 74/421 A |
| 7,258,037 B2 * | 8/2007 | Wiederrecht | | 74/461 |
| 7,633,837 B2 * | 12/2009 | Daout | | 368/220 |
| 7,969,825 B2 * | 6/2011 | Daout | | 368/220 |
| 8,011,267 B2 * | 9/2011 | Scheufele | | 74/461 |
| 8,042,423 B2 * | 10/2011 | Bannier et al. | | 74/461 |
| 2004/0211278 A1 | 10/2004 | Gmirya | | |
| 2008/0146402 A1 * | 6/2008 | Shinohara | | 475/331 |

OTHER PUBLICATIONS

"European Application Serial No. 09719238.9, Office Action mailed Mar. 22, 2012", 5 pgs.

"European Application Serial No. 09719238.9, Office Action Response filed Jan. 25, 2012", 8 pgs.

"International Application Serial No. PCT/US2009/036553, International Preliminary Report on Patentability mailed Mar. 28, 2011", 5 pgs.

"International Application Serial No. PCT/US2009/036553, Receipt of Demand mailed Feb. 2, 2010", 2 pgs.

"International Application Serial No. PCT/US2009/036553, Search Report Opinion mailed May 12, 2009, Demand for Preliminary Examination filed Dec. 23, 2009", 3 pgs.

"International Application Serial No. PCT/US2009/036553, Written Opinion mailed May 12, 2009", 5 pgs.

"International Application Serial No. PCT/US2009/036553, Search Report and Written Opinion mailed May 12, 2009".

* cited by examiner

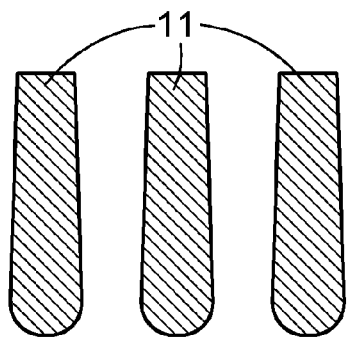
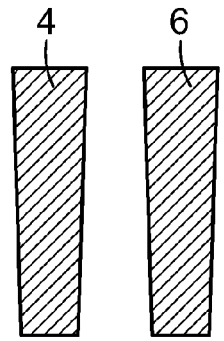
FIG. 3　　　　　　　FIG. 4
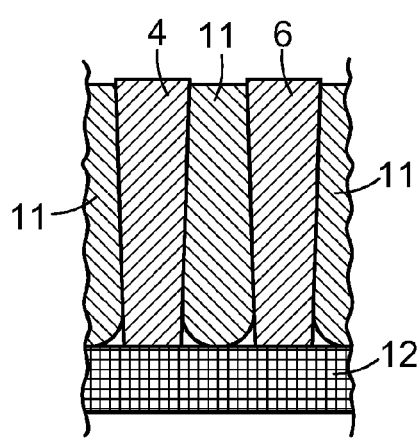
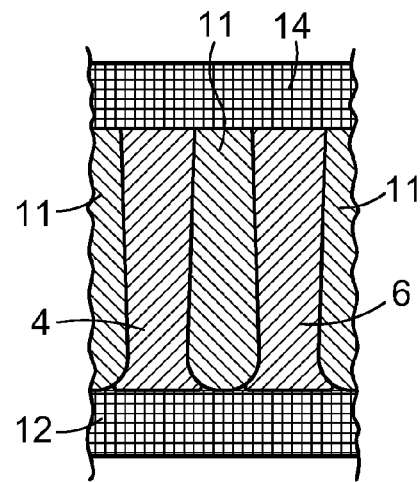
FIG. 5　　　　　　　FIG. 6
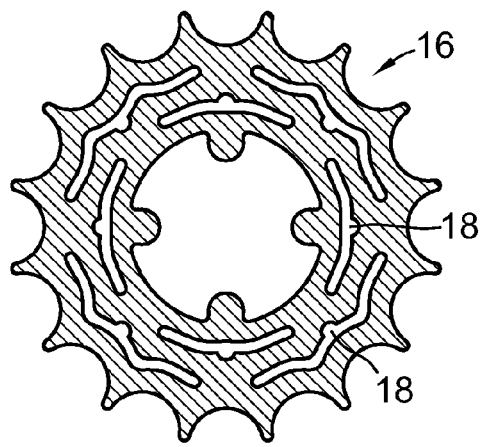
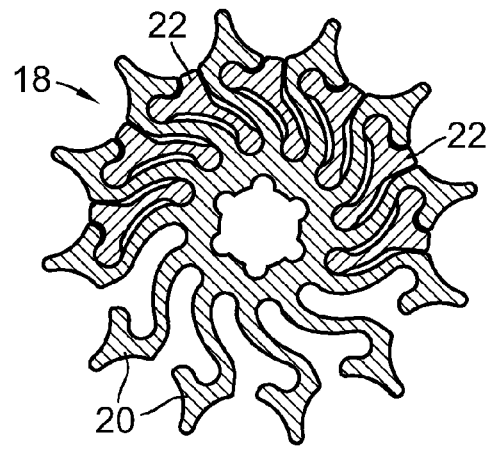
FIG. 7　　　　　　　FIG. 8

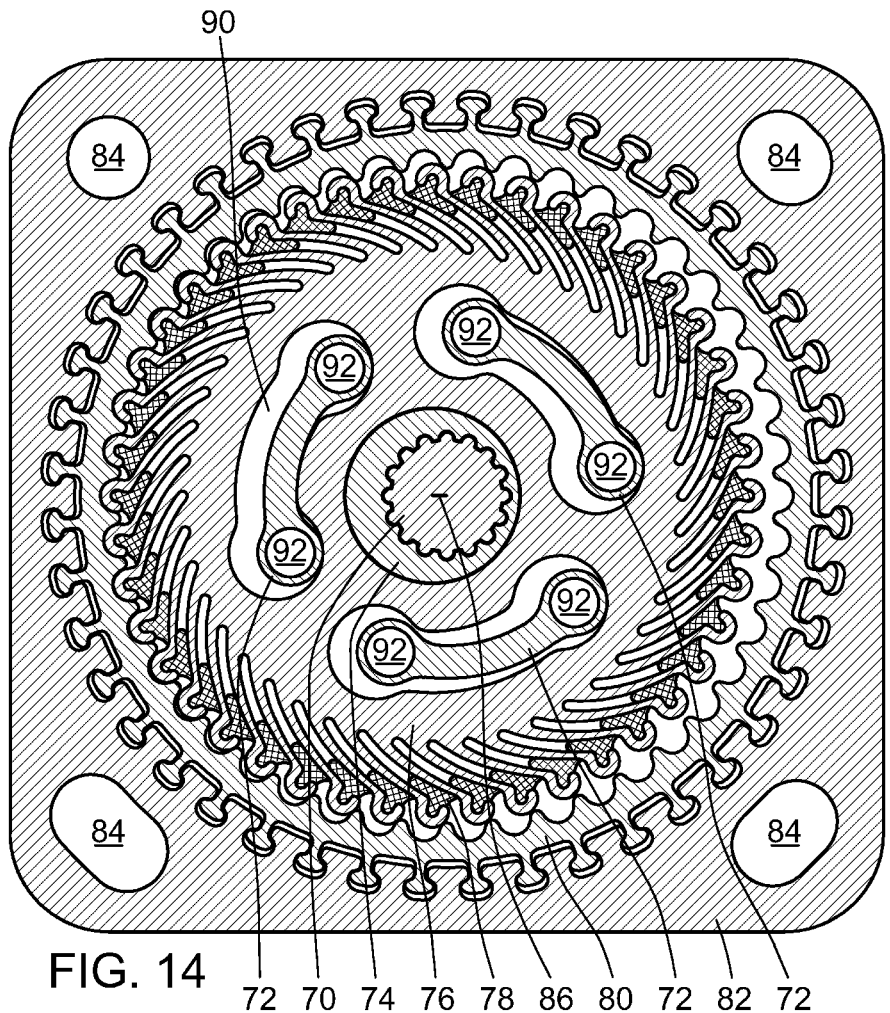
FIG. 14    72 70 74 76 78 86 80 72 82 72
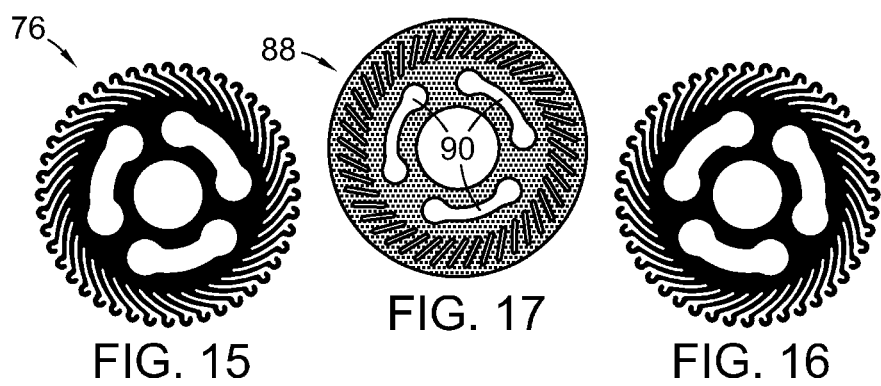
FIG. 15    FIG. 17    FIG. 16

TORQUE-HANDLING GEAR WITH TEETH MOUNTED ON FLEXIBLE ARMS

This application is a U.S. National Stage Filing under 35 U.S.C. 371 from international patent application Serial No. PCT/US2009/036553, filed on Mar. 9, 2009 under 35 U.S.C. §363, published on Sep. 17, 2009 as WO 2009/114477 A2, and republished as WO 2009/114477 A3, claiming priority under 35 U.S.C. §119(e)(1) to U.S. provisional patent appl. ser. No. 61/035,055, filed Mar. 10, 2008, said applications and publications incorporated herein by reference in their entirety.

FIELD OF THE INVENTION

The present invention pertains to gears for handling and transferring torque. One embodiment is a rack-and-pinion gear set useful for supporting and driving a rail car.

BACKGROUND OF THE INVENTION

The teeth of conventional gears for handling and transferring torque usually comprise hard and rigid metal, typically steel. Individual teeth are so short along the radii relative to their tangential dimension that tangential deflection is imperceptible.

Teeth on gears usually have a convex shape or profile when intersected by a plane (gear plane) perpendicular to a gear axis about which the gear rotates. Gears in the form of racks do not have an axis per se, but one can envision a similar plane for them as well. The most common type of gear profile has an involute shape that allows the meshing teeth to roll with respect to each other with little or no slipping between the surfaces.

Typically, meshing surfaces of gear teeth make a single line contact between the surfaces of the two meshing teeth because of the convex shapes of the teeth on both gears. Actually, the line of contact has a small effective width due to compression of the material of the two teeth at and adjacent to the theoretical line of contact, and to force that lubricant transmits at the line of contact. Nevertheless, the area of contact between two meshing teeth is very small compared to the total meshing area of the teeth.

When first and second gears are in use to transmit torque between them, it may appear that force transfer occurs between two or more meshing pairs of teeth. Because of unavoidable deviations from the ideal in the gears' shapes, at any given instant a single tooth on each gear transfers almost all of the torque at any given time, or at least much of the time.

The stress generated at the line of contact by the compressive force between the two meshing teeth is called Hertzian contact stress. The force between the two meshing teeth causes high Hertzian contact stress at lines of contact because of the small contact area. Hertzian contact stress limits high-speed torque ratings of most gears used today. All gears can handle less torque at high speeds than at low speeds because of vibration and higher impact loading at higher speeds.

To transmit adequate amounts of torque, gears typically comprise strong materials such as steel. Steel and other strong materials intrinsically have high moduli of elasticity, i.e., are stiff, which means that relatively thick beams, which gear teeth essentially are, deflect very little during operation. Further, stiff materials do not damp vibration well, so conventional gears generate noise and vibration. Conventional rigid gears also resist shock loading poorly.

Gears made of inexpensive plastics having a low modulus of elasticity and low strength compared to metals are much better at damping vibration, but cannot carry much torque. Gears made of plastics reinforced with high-strength fibers have the intrinsic capacity to carry high torque, but they resist Hertzian contact stress poorly.

Some prior art gears have circular rather than involute profiles in an attempt to change the contact area between individual teeth from line to surface. But even circular profiles cannot ensure large surface contact between the gear teeth because their rigidity cannot compensate for inherent misalignments and incompatibilities of various types.

U.S. Pat. No. 4,140,026 describes a gear set having one gear with flexible teeth. The flexible teeth improve torque handling in a gear set having one gear with convex tooth profiles and the other with concave teeth profiles, by shifting the line of contact toward the root of the weaker concave teeth.

SUMMARY OF THE INVENTION

A gear having flexible teeth addresses many of these problems with conventional gearing. Such a gear may form the first gear of a gear set that includes a second gear, to allow for efficiently transferring torque between the gears. Such a gear having flexible teeth includes a hub having an axis and a first periphery.

A plurality of arms each made of an elastic material have a first end attached to the hub at a preselected attachment point. A second end of each arm coincides with an arm line lying in a gear plane perpendicular to the axis and passing through the attachment point. This arm line makes an acute arm angle with a radius line extending from the gear's axis in the gear plane through the attachment point. In this context, "acute angle" includes 0°.

The arms' attachment points are spaced around the hub so that each pair of adjacent arms defines a slot between them. Each arm has a dimension in the gear plane allowing elastic deflection in the gear plane as a cantilevered beam. The end of each arm carries a tooth for meshing with a tooth on the second gear to allow transfer of force between the first gear's tooth and the meshing second gear's tooth.

A load distributor in each of a plurality of the slots contacts at least a first of the arms defining the slot and a second arm, which second arm may or may not also define that slot. Each load distributor distributes to the second arm at least a portion of the force or load applied to the tooth on the first of the arms defining the slot. The load distributor for the second arm usually distributes load applied to that second arm by the first arm, to a third arm in a cascade manner. Even arms carrying teeth not in mesh at a given instant carry load imposed by arms carrying teeth that are in mesh.

When the arm angle is greater than 0°, the teeth will deflect both radially and tangentially. The radial deflection allows teeth with circular profiles to function properly. The tangential deflection is valuable because it assures that every meshing tooth and its arm share the load with other arms on its gear whether the teeth have circular or involute profiles.

This arrangement allows two or more teeth on one of the gears to simultaneously contact and transfer force to the other gear's teeth. Allowing a number of teeth to share the force transferred from one gear to the other reduces the Hertzian contact stress in each of the meshing teeth and therefore increases the torque-transferring capacity of the gear set. The load sharing by several arms and teeth allows a gear of this construction to handle higher torque than Hertzian contact stress would otherwise allow.

The load distributor may comprise a spacer or insert in each slot so that force on a particular arm is distributed through the insert to adjacent arms, to thereby increase the torque-transferring capacity of the gear. The inserts may be either plastic or steel. An elastic ribbon or strand may also transfer the force to adjacent arms.

In some embodiments, the individual arms may be curved. In others, they may be straight, with the arm angle greater than 0°. Where the arm angle is 0°, a straight arm will deflect radially very little. A curved arm with an arm angle of 0° may provide radial deflection.

BRIEF DESCRIPTION OF THE DRAWINGS

FIG. 3 is a schematic cross-section of three teeth of a gear according to the invention after a first fabrication step.

FIG. 4 is a schematic cross-section of two inserts between arms of the gear after the first fabrication step.

FIG. 5 is a schematic cross-section of the teeth, inserts, and a mold assembled before beginning a second fabrication step.

FIG. 6 is a schematic cross-section of the teeth, the inserts, the mold, and a press after the second fabrication step.

FIGS. 7 and 8 show the invention embodied in chain sprockets.

FIG. 14 shows a part of a cycloidal speed reducer including cross sections of the input and output shafts.

FIG. 15 is a plan view of a counterclockwise gear built according to the invention for use in the cycloidal speed reducer of FIG. 14.

FIG. 16 is a plan view of a clockwise cycloidal gear built according to the invention for use in the cycloidal speed reducer of FIG. 14.

FIG. 17 is a plan view of a disk that reinforces the output shaft of FIG. 14.

DESCRIPTION OF THE PREFERRED EMBODIMENTS

Figure 1:
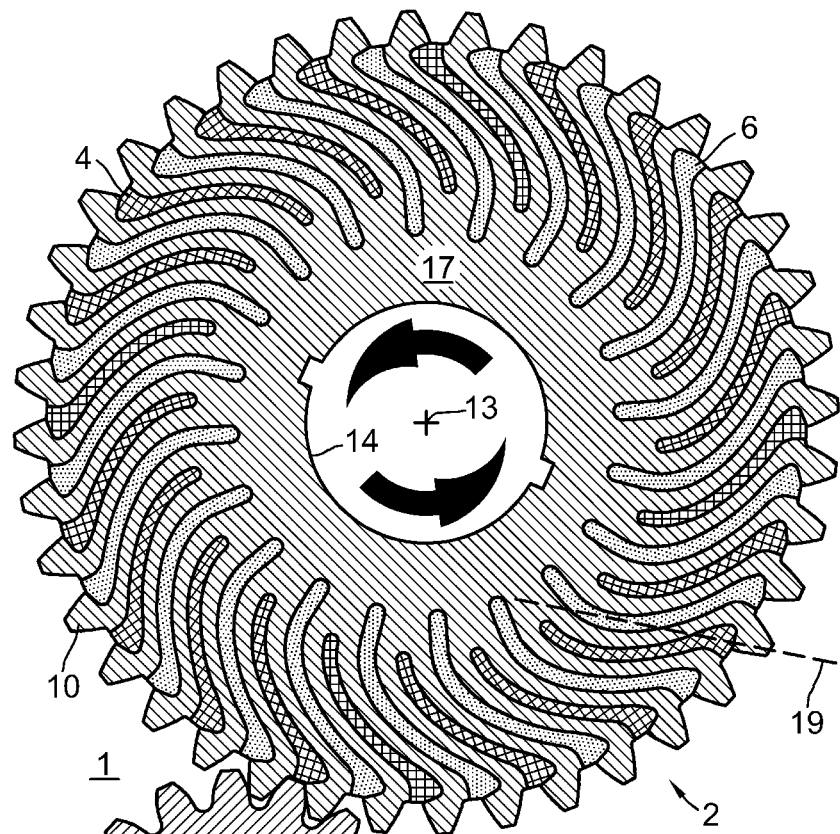
FIG. 1 is a plan view of a gear incorporating the invention and a pinion in a meshing engagement with each other.

FIG. 1 shows a gear set 1 comprising a gear 2 meshing with a pinion gear 8 for transmitting torque between them. In this example, gear 2 rotates in the direction indicated by the arrows about an axis 13 and drives gear 8. Gears 2 and 8 have respectively, hubs 17 and 15 with central openings 14 and 16 for mounting on shafts for rotation. Gears 2 and 8 lie in a gear plane coincident with the paper plane for FIG. 1.

Figure 2:
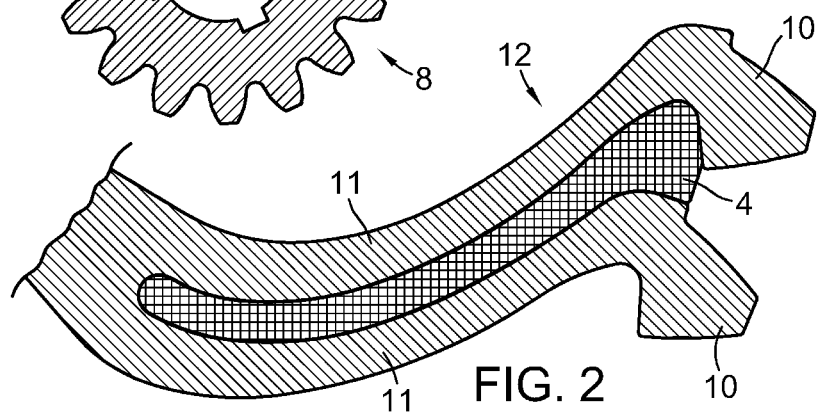
FIG. 2 is an enlarged plan view of a single arm on the gear that FIG. 1 shows.

FIG. 2 shows two individual tooth-arm units 12, each tooth-arm unit 12 comprising a tooth 10 mounted or attached on the outside end of a slender spiral arm 11 forming a cantilevered beam. The thinness of arms 11 relative to their length allow arms 11 to flex elastically under load, allowing teeth 10 to shift both radially and tangentially. That is, teeth 10 will under load, shift in any direction within the gear plane because of the flexibility of arm 11.

In FIG. 1, each arm 11 is integral with hub 17 at an attachment point. A line 19 drawn between the attachment point of an arm 11 to hub 17 and the tooth 10 on the end of that arm 11 forms an acute arm angle with a radius line passing through axis 13 and the arm 11 attachment point. "Acute angle" in this context also includes 0°.

Each pair of adjacent arms 11 defines a slot between them. Torque applied to gear 2 creates force on each meshing tooth 10 that causes the arm 11 supporting that tooth 10 to flex slightly both radially and tangentially. This flexing allows typically two teeth 10 to transfer at least some of the force to the two meshing teeth on gear 8 irrespective of manufacturing tolerances and vibration at high speed. Essentially, the compliance in arms 11 assures that the meshing teeth 10 on the driving gear 2 each transfer a part of the total force to the meshing teeth on gear 8.

Since at least two teeth 10 are in meshing relationship with gear 8 teeth, for a given amount of torque on gear 2, the Hertzian stress on any individual tooth 10 (and of course on the teeth of gear 8) is lower than for a rigid gear of the same size. Since at least two teeth 10 simultaneously engage the meshing teeth on the companion gear 8, the torque transfer between gears 2 and 8 can actually be higher than for rigid gears because the individual teeth do not exceed their Hertzian stress limit. This effect is greatest at higher speeds.

The flexible mounting of teeth 10 reduces impact between teeth 10 and the gear 8 teeth as they begin to mesh, further reducing both peak Hertzian stress and noise arising from the impact. Teeth 10 carried on spring steel arms 11 may deflect tangentially by perhaps 5-20 minutes and deflect radially by perhaps 0.05-0.2% of the gear 2 radius at the teeth 10.

One might think that the flexibility of arms 11 limits the total amount of torque transferable between gears 2 and 8. To address this problem, the individual slots between arms 11 have within them, flexible spacers or inserts 4 and 6 that function as load or force distributors. Inserts 4 are shorter than inserts 6. Each insert 4 or 6 mechanically contacts the two adjacent arms 11.

An arm 11 receiving load on its tooth 10 flexes a slight amount to apply force to one of the adjacent insert 4 or 6 to thereby transfer or distribute force applied to that tooth 10, to several adjacent arms 11. Each insert 4 or 6 transfers or distributes a percentage of the total force generated by the torque from the driving gear (gear 2 in FIG. 1) to at least one and usually to several of the adjacent arms 11, some of which carry currently non-meshing teeth 10. The inserts 4 and 6 must either be somewhat compressible or if not, have a slight amount of clearance within their individual slots to allow for flexure of the arms 11 and transfer of force.

Inserts 4 and 6 may have on the order of 5-50 microns of clearance in their slots, depending on the length of arms 11. Smaller clearances cause loads on one arm 11 to distribute to more arms 11 carrying non-meshing teeth 10. Indeed, a 5 micron gap between inserts 4 and 6 and their adjacent arms 11 may distribute loads on one arm 11 to most of the other arms 11 on gear 2. The level of load distribution depends on the length of arms 11, the diameter of gear 2, the stiffness of inserts 4 and 6, the length of the gaps between inserts 4 and 6, and, where inserts 4 and 6 are stiff (made of steel for example), the distance between adjacent arms 11.

Inserts 4 and 6 may comprise relatively soft and flexible material such as plastic or may comprise steel similar to that comprising the other components of gear 2. Inserts 4 and 6 made of steel allow less bending of arms 11 for a given load, so the width (tangential dimension) of the slots between arms 11 becomes important.

The elastic properties of tooth-arm units 12 reduce gear set 1 vibration, meshing noise, and wear at high angular speed. Finite element analysis suggests that the torque rating of gear 2 is slightly higher in the direction indicated by the arrows than in the opposite direction because arms 11 are not symmetrical.

While FIG. 1 shows central hubs 15 and 17, the concept can also apply to ring gears with interior teeth projecting toward the center (axis) of the gear. In such an embodiment the arms of the invention project generally toward the center of the ring from the interior surface of the ring. Teeth on the arms have profiles facing toward the center of the ring. For purposes of this application, the term "hub" includes the ring of a ring gear.

Cutting a spring steel plate is a relatively expensive way to make gear 2. Forming the slots in such a process requires long cuts and because it is difficult to harden the surface of the spring steel. An alternate method for making the gears is by sintering steel powder in a mold even though the fatigue strength of the sintered gear is typically lower than the fatigue strength of the spring steel. For example, the fatigue strength of hardened and tempered 50HS chromium silicon spring steel is 780 MPa. Shot peening improves its fatigue strength to 860 MPa.

Ancorsteel 4300 is a steel powder suitable for the gears. (Ancorsteel is a registered trademark of Hoeganaes Corporation, Cinnaminson, N.J. 08077.) The fatigue strength of tempered Ancorsteel 4300 is about 320 MPa. Despite their low fatigue strength, the sintered gears can match the torque rating of the gears made of spring steel because the gaps between the arms and inserts of the sintered gears can be much smaller than the gaps in the spring steel gears.

As explained above, the size of the gaps has dramatic impact on the stress inside the gears. The smaller gaps lower the stress because the arms and the inserts reinforce each other very well.

FIGS. 3, 4, 5, and 6 are drawings showing structure of a sintered gear at several stages during a preferred process of fabrication. Gear 2 is preferably formed by a sintering process. This process results in very short gaps between arms 11 and inserts 4 and 6, which increases load distribution from one arm 11 to many others.

The gear 2 and the inserts 4 and 6 are made in separate molds in a first fabrication step. The cross-section of three arms 11 of the gear 2 is shown in FIG. 3. The cross-section of two inserts 4 and 6 is shown in FIG. 4.

FIG. 5 depicts the gear 2 and the inserts 4 and 6 after being assembled in a mold 12 in preparation for a second fabrication step. The inserts 4 and 6 are coated with a mold release agent such as boron nitride spray.

FIG. 6 shows the shape of the arms 11 and the inserts 4 and 6 after the second fabrication. In the second fabrication step the mold and its contents are heated before a press re-shapes the inserts 4 and 6. Plastic deformation of the bottom of the inserts 4 and 6 permanently locks the inserts 4 and 6 between the arms 11. The release agent prevents the inserts 4 and 6 from bonding to the arms 11. The final interface between the arms 11 and the inserts 4 and 6 is defined by the shape of the arms 11 because sintering of the arms 11 occurs at a higher temperature than the melting point temperature of the inserts 4 and 6.

The final fabrication step is hardening the teeth 10 contact surfaces by rolling or other work hardening processes.

Figure 9:
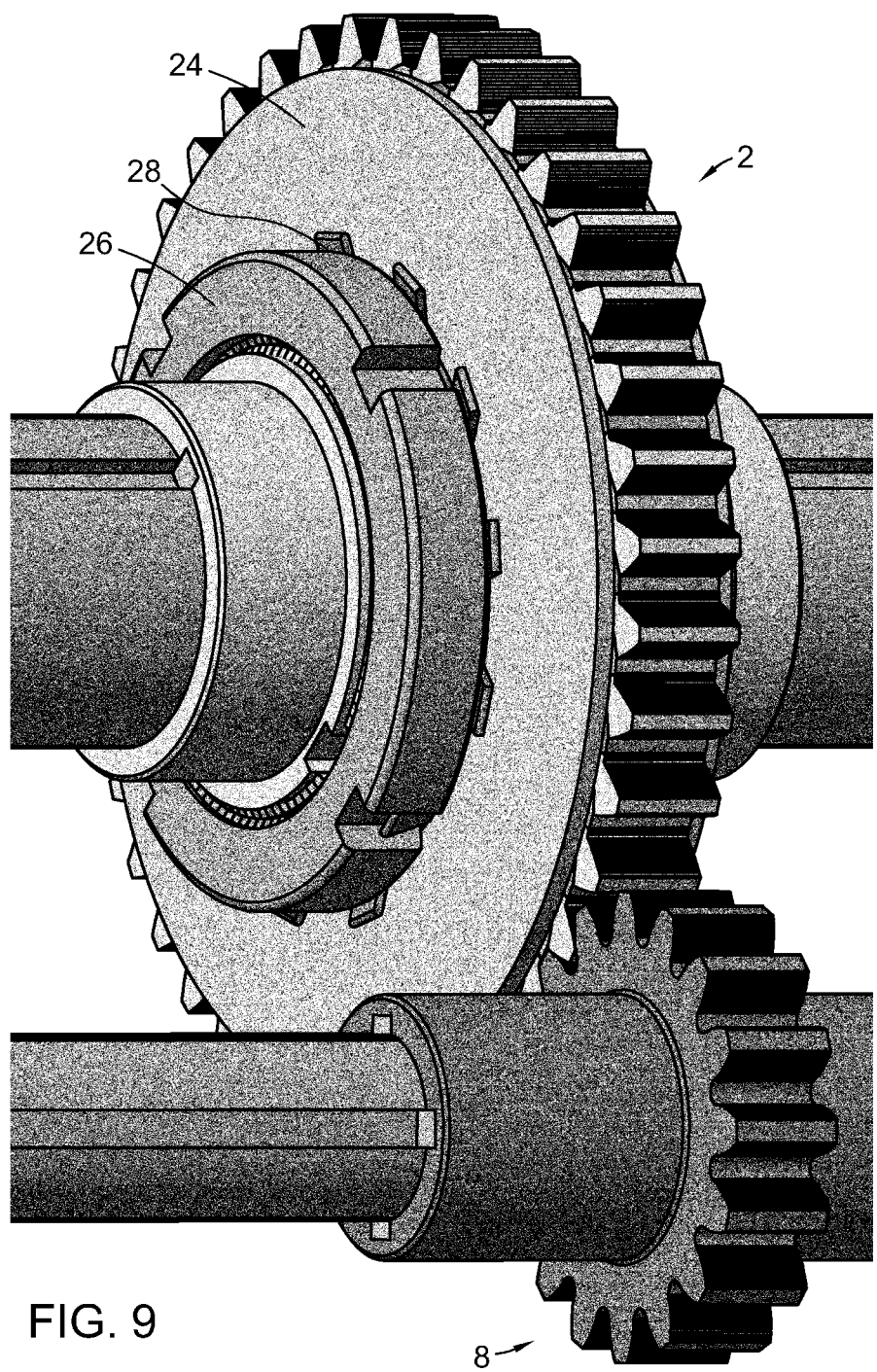
FIG. 9 is a perspective view of a gear set according to the invention.

FIG. 9 is a perspective view of gear set 1 of FIG. 1. Gear 2 is fabricated by cutting steel blanks. Side plates 24, lock nuts 26, and lock washers 28 hold the inserts 4 and 6 in place. (Nut 26 and lock washer 28 on the side of gear 2 facing away from the viewer are not visible.) A sintered gear 2 can hold inserts 4 and 6 within the slots between arms 11 without side plates 24, lock nuts 26, and lock washers 28.

FIG. 7 shows a radially flexible sprocket 16 for roller chains. Sprocket 16 has radial elasticity due to holes 18. The elastic properties of the sprocket 16 reduce vibration and automatically adjust the tension of the roller chain.

FIG. 8 shows a small sprocket 18 for roller chains and having structure similar to gear 2 in FIG. 1. Outer ends of individual arms 20 define teeth for sprocket 18. Inserts 22 between them allow controlled flexing of arms 20 when under load that reduces the force on any individual tooth. The noise and wear of sprocket 18 is lower because its flexible arms 20 automatically adjust to wear of the roller chain links. FIG. 8 shows five inserts 22 removed to allow better understanding of the shape of the arms 20.

Figure 10:
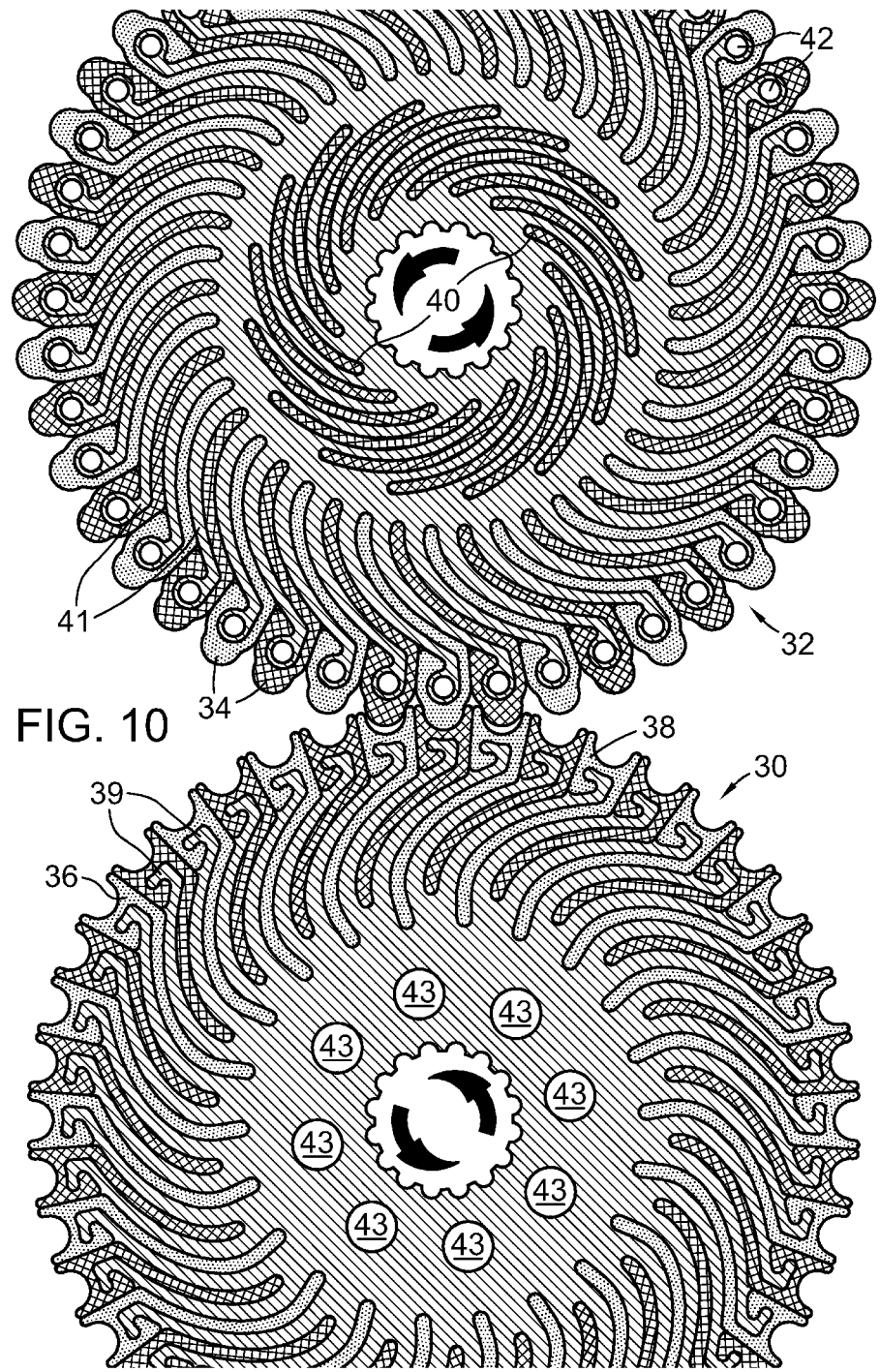
FIG. 10 shows a gear set comprising two gears having teeth with circular profiles carried on flexible arms.

FIG. 10 shows a pair of similar sized larger gears 30 and 32. Gear 30 has discrete, detachable tooth elements 36 and 38 that fit between arms 39 to serve as spacers as well as teeth. Gear 32 also has discrete, detachable tooth elements 34 that fit between arms 41 to serve as inserts in the slots between arms 41. Tooth elements 34 mesh with the tooth elements 36 and 38. Tooth elements 34, 36, and 38 should be made of metal for higher load applications. Holes 42, 43 accept fasteners for attaching retainer plates when necessary to gears 30 and 32 to hold elements 34, 36, and 38 in place. If gears 30 and 32 are made by sintering, elements 34, 36, and 38 may not require retainer plates.

Gear 32 has inner slots 40 and tip holes 42 that enhance the radial elasticity of gear 32. Inner slots 40 may be filled with inserts that reinforce gear 32 and determine the force required to radially compress gear 32. The radial elasticity of gear 32 helps maintain contact between tooth elements 34 and 36.

The tooth profiles on elements 34, 36, and 38 are circularly cylindrical rather than involute in order to maximize the contact and thereby to minimize their wear and meshing noise. The circular profile of tooth elements 36 and 38 makes gear 30 also usable as a sprocket for roller chains.

If gears 30 and 32 are made of steel, the arms 39 must be very slender to provide adequate radial elasticity. Radial elasticity ensures uninterrupted contact between their circular tooth profiles. If the gears 30 and 32 are made of plastic, they are more elastic, so it is easier to ensure the uninterrupted contact between teeth 34 and 36. Gears made of plastic reinforced with short, randomly oriented glass fibers are common in the prior art. They are stronger than pure plastic gears, but the fibers are abrasive, so these gears wear out quickly if they have involute teeth. The circular profile of teeth 34 and 36 often last longer because their contact surface is larger.

Figure 12:
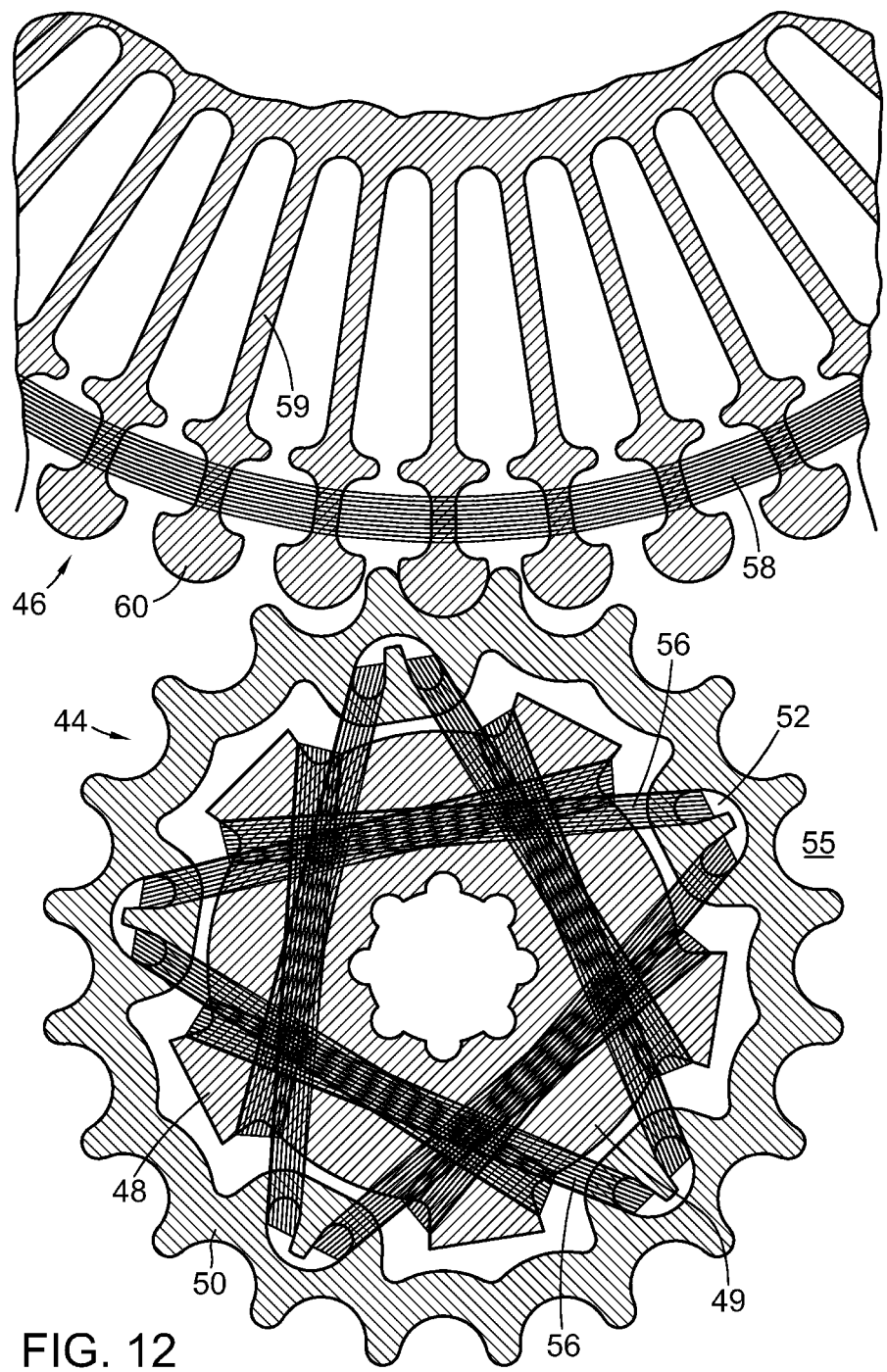
FIG. 12 shows a pinion having flexibly mounted teeth engaging a fragment of the gear shown in FIG. 11.

FIG. 12 shows a gear set comprising a gear 46 and a complementary gear 44 in mesh with gear 46. Gear 44 comprises a ring 50 carrying circularly cylindrical grooves 55 on an outer periphery. A hub 49 is within and spaced from ring 50. The inner periphery of ring 50 has a plurality of cleat-type apertures 52 serving as ring attachment features. Hub 49 has an axis and a periphery, and a plurality of hub attachment features comprising shoulders 48 around the periphery thereof.

Strands 56 wrap around shoulders 48 on the periphery of a central hub 49 and pass through the cleat-type apertures 52 in ring 50. In the arrangement shown in FIG. 12, ring 50 has five apertures 52 equally spaced around the interior of ring 50 but may have more, or possibly, less. Hub 49 has five shoulders 48 equally spaced around the periphery of hub 49. Strands 56 loop around adjacent shoulders 48 and then pass through opposing apertures 52 to form a five-pointed star pattern.

Tension in strands 56 causes strands 56 to support ring 50 in substantial concentric alignment with hub 49 while no radial load on ring 50 is present. When teeth 60 of gear 46 apply radial load to ring 50, this load radially displaces ring 50 slightly relative to hub 49, changing the concentric alignment of ring 50 and hub 49. This displacement stretches strands 56 passing through apertures 52 on the opposite side of ring 50 to maintain at least a minimum radial force between teeth 60 and ring 50 over a range of spacing between the axes of gears 44 and 46.

Figure 11:
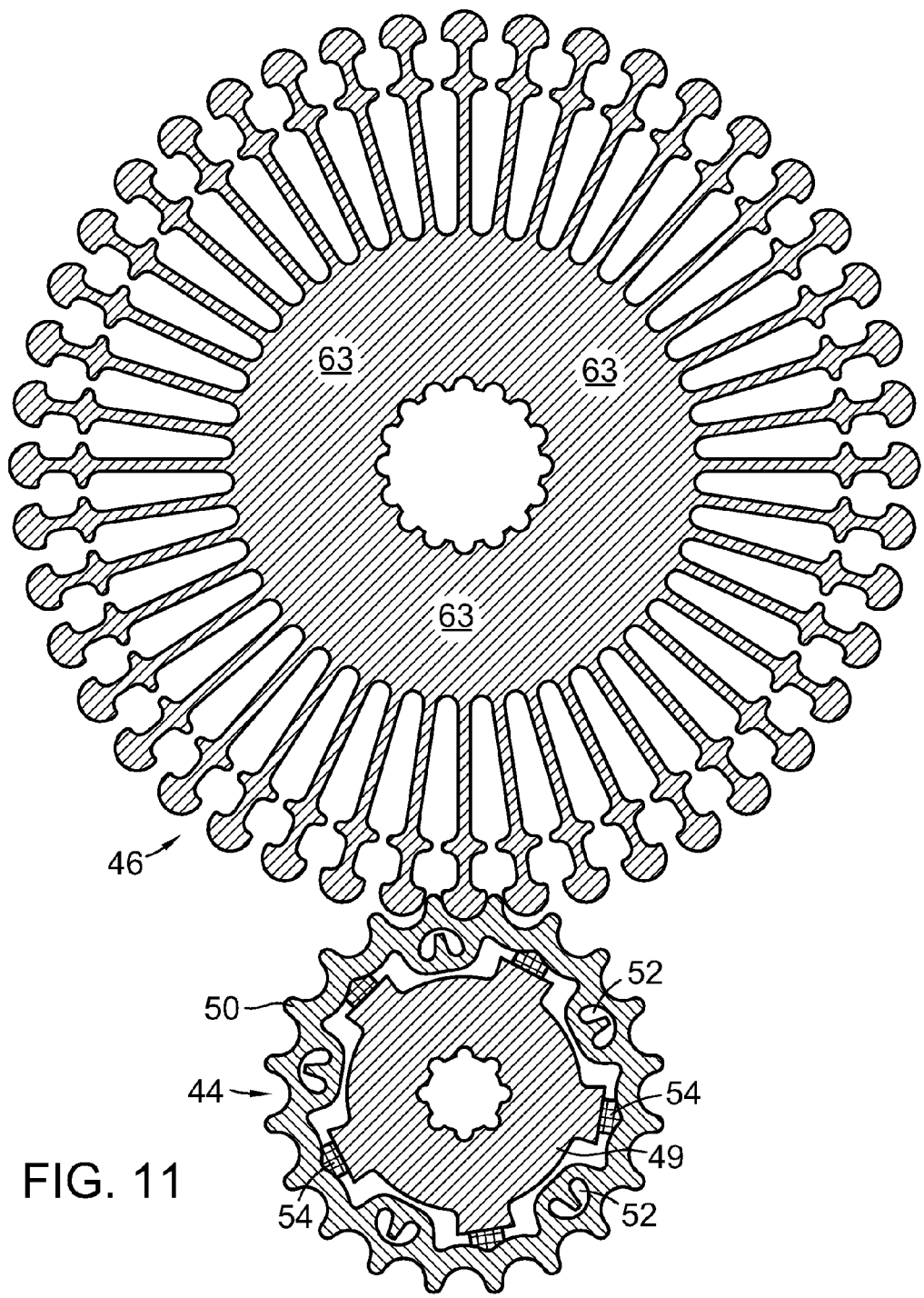
FIG. 11 is a plan view of the pinion and a gear of FIG. 12 in an intermediate stage of manufacture.

FIG. 11 shows a process for installing ring 50 on hub 49. Temporary spacers 54 placed between hub 49 and ring 50 hold ring 50 in concentric relation with hub 49. Strands 56 are wound through apertures 52 and around shoulders 48 to link ring 50 and hub 49. These temporary spacers 54 are removed after winding of strands 56 is complete.

Gear 46 has a plurality of arms 59 extending radially outward from a hub 63 to define between them, slots into which each arm can deflect elastically. Each arm 59 carries a tooth 60 with a circularly cylindrical profile matching the profiles of grooves 55.

An elastic band or strand 58 connects each of the arms 59 to its neighboring arms 59. Bonding, winding or both winding and bonding, fastens strands 58 to each of the arms 59. Strands 58 distribute tangential loads on any arm 59 to adjacent arms 59. This arrangement allows a single arm 59 to transmit much more torque to hub 63 than if strands 58 were not present. While gear 46 has substantial tangential flexibility, it also can transmit substantial torque as well because strands 58 serves as a load distributor.

Vectran brand fibers made of a liquid crystal polymer is a good choice for strands 56 and 58 because the creep for this material is negligible. (Vectran is the trademark of Hoechst Celanese.) Preferably, fibers 56 are coated with a glue before installing. One suitable glue for the purpose is Loctite E-214HP Hysol epoxy. (Loctite and Hysol are trademarks of Henkel Corporation.) A small SCARA (Selective Compliant Assembly Robot Arm) device can wind the strands 56 and 58 on both gears 44 and 46. The Vectran fibers are lightweight and more resistant to fatigue than steel.

Figure 13:
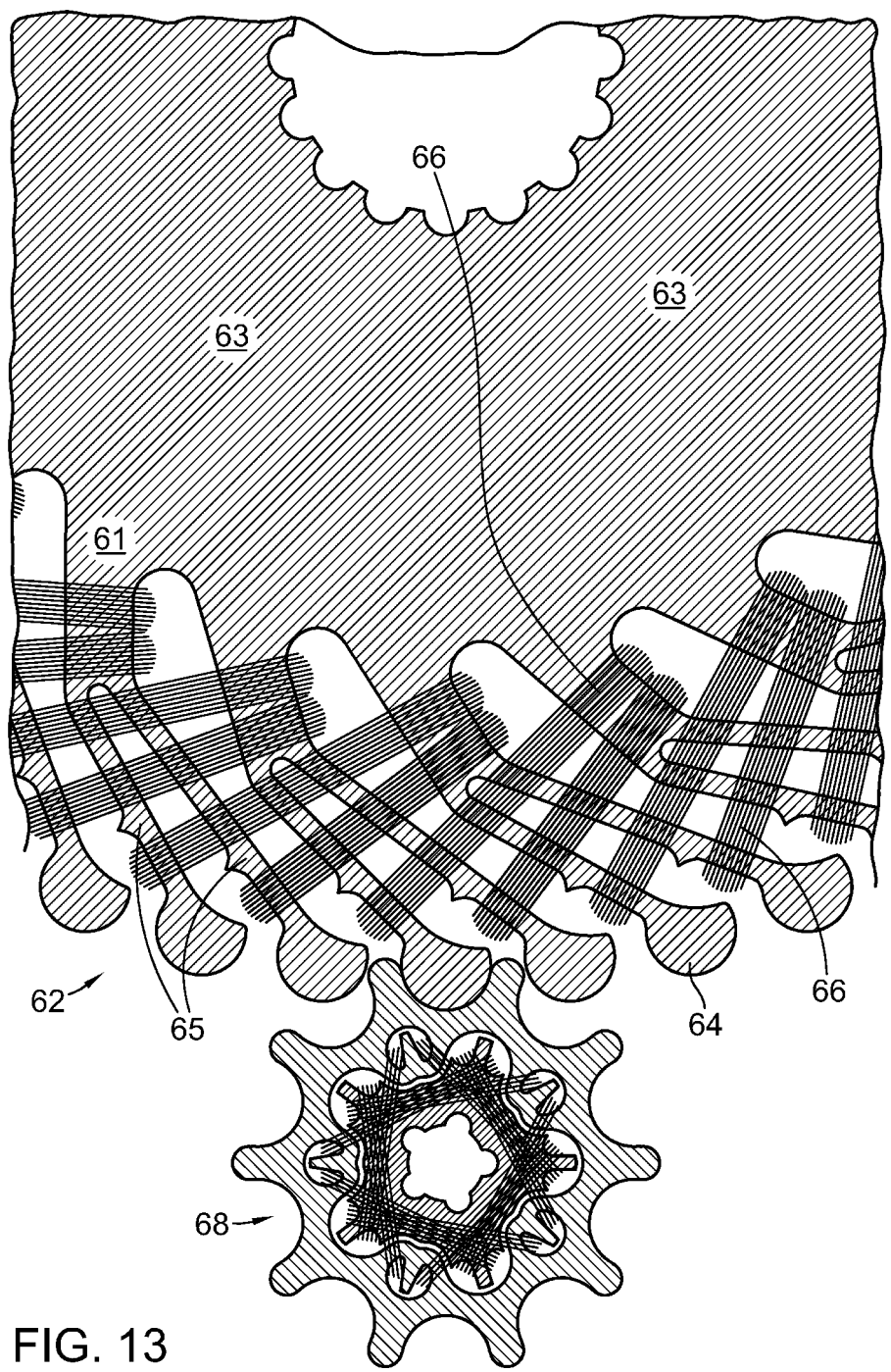
FIG. 13 is an enlarged plan view of a pinion similar to that of FIG. 12 and a fragment of a gear having stub-mounted arms.

FIG. 13 shows gears 62 and 68 similar to gears 44 and 46 of FIG. 12. Gear 62 differs from gear 46 in that the arms on gear 62 comprise a stub arm 61 projecting from a hub 63 at an angle with respect to a radius line. Each stub arm 61 carries a pair of arm extensions 65. Each arm extension 65 carries a tooth 64. Extensions 65 project from stub arms 61 at an angle with respect to a radius line different from the stub arm angle. Arm extensions 65 in FIG. 13 extend along an angle with respect to a radius line greater than the stub arm angle, to in essence form an elbow-shaped extension.

Gear 62 has ribbons or strands 66 wound around arm extensions 65 and stub arms 61 to provide load distribution from arms 65 to stub arms 61. Strands 66 may comprise material similar to that used for strands 56 in FIG. 12. When gear 62 transfers torque to gear 68, then strands 66 will only provide load distribution from an arm extension 65 a stub arm 61 when gear 62 rotates counterclockwise.

Figure 18:
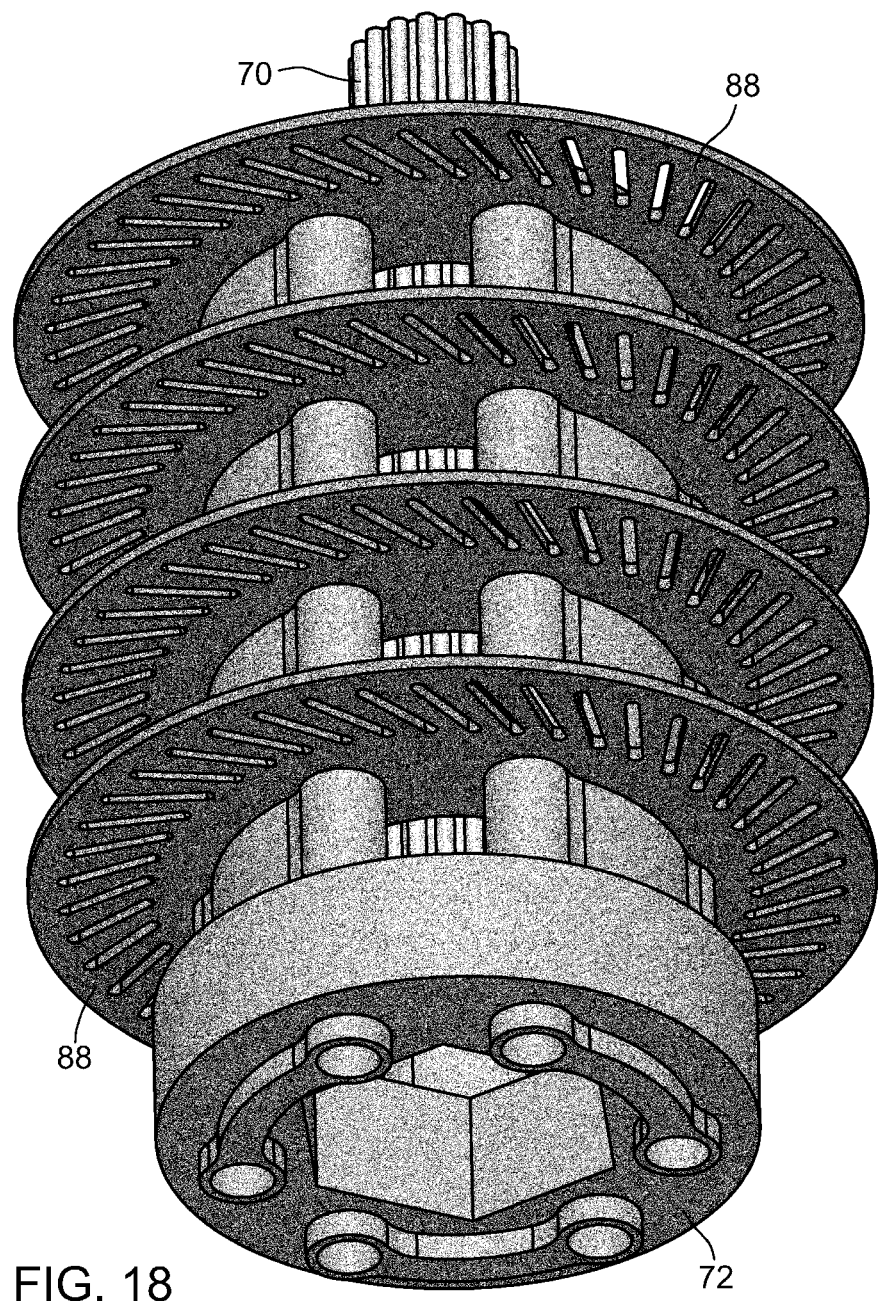
FIG. 18 is a perspective view of an output shaft for a cycloidal gear reducer and several reinforcing disks mounting on the output shaft.

FIGS. 14-18 show a cycloidal gear train with a high gear ratio and comprising a plurality of layers of the elastic gears. FIG. 14 depicts one layer of the gears and cross-sections of an input shaft 70 and an output shaft 72. A perspective view of both shafts is shown in FIG. 18. A motor or an engine transmits the power to the input shaft 70. The input shaft 70 transmits the power to a cam 74. The cam 74 is an eccentric, hollow disk. The input shaft 70 and the cam 74 rotate about the center of the input shaft 70. The cam 74 converts the rotation of the input shaft 70 into hypocycloidal motion of a cycloidal gear 76. A lubricant placed between the cam 74 and the cycloidal gear 76 reduces the friction between them. Plastic inserts 78 are placed between the teeth of the cycloidal gear 76. A ring gear 80 is held by a brace gear 82, but it can flex in the radial direction. All parts of the cycloidal speed reducer are held together by bolts in holes 84.

All gears belonging to the same layer: the cam 74, the cycloidal gear 76, the inserts 78, the ring gear 80, and the brace gear 82 are in the same plane and have the same thickness, which is usually less than one centimeter. All these parts constitute one layer of the gears. An imaginary line 86 connecting the center of the input shaft 70 with the center of the cycloidal gear 76 is called the phase. Every layer of the gears has different angle of the phase 86 in order to minimize vibration of the cycloidal speed reducer and to minimize radial forces acting upon the input shaft 70.

The cycloidal gear 76 depicted in FIG. 14 is the same as the cycloidal gear depicted in FIG. 15. The teeth of these cycloidal gears point in the counterclockwise direction, so their chirality is counterclockwise. The teeth of the cycloidal gear depicted in FIG. 16 point in the clockwise direction, so the gear has clockwise chirality.

The hypocycloidal motions of the cycloidal gears 76 slowly rotate the output shaft 72. The output shaft 72 is made of three identical parts that are welded together. Its complex shape gives it sufficient strength to withstand large torque generated by the cycloidal speed reducer. If the output shaft 72 is long relative to its diameter, it should be reinforced with at least one disk 88 placed between the layers. The disk 88 has three large holes 90 that perfectly match the shape of the output shaft 72. It also has large number of small holes near its outer edge to improve circulation of air that cools the cycloidal speed reducer. If the adjacent cycloidal gears 76 have the same chirality, thin disks 88 are placed between adjacent cycloidal gears 76 to hold the inserts 78 in place.

The optimum design of the layers depends on the size of the gears. If the gears are small, the ring gear 80 is fused with the brace gear 82.

If the gears have moderate size and the output torque has fixed direction (clockwise or counterclockwise), all cycloidal gears 76 have the same chirality and the shape shown in FIG. 15 or FIG. 16.

If the gears have moderate size and both clockwise and counterclockwise output torque is needed, the cycloidal gears 76 have the shapes depicted in FIG. 15 and FIG. 16, and the adjacent cycloidal gears 76 have opposite chiralities so that they can hold the inserts 78 in place. The angle between the phases 86 of the adjacent cycloidal gears 76 is approximately 120 degrees. The cams 74 are held in place by adjacent cycloidal gears 76 because the angle between the phases 86 of adjacent cycloidal gears 76 is large.

If the gears are big, the shape of the cycloidal gear 76 is similar to the shape of the convex gear 32 shown in FIG. 10, and the brace gear 82 has long teeth and spacers shaped like the spacers 36 and 38, which are also shown in FIG. 10. The adjacent layers have opposite chiralities of the cycloidal gears 76 and of the brace gears 82 so that these gears can hold their inserts.

When the cycloidal speed reducer is assembled, one end of the output shaft 72, called the input end, is close to the motor. The other end, called the output end, denoted with reference numeral 72 in FIG. 18, is affixed to an object powered by the cycloidal speed reducer. If the output shaft 72 is long relative to its diameter, it twists elastically under large torque generated by the cycloidal speed reducer. If all the holes 84 are as small as the bolts placed in these holes, the forces between the cycloidal gears 76 and the output shaft 72 are greater at the output end than at the input end due to the twisting of the output shaft 72.

This means that some torque produced by the cycloidal gears 76 at the input end cannot be transmitted to the output shaft 72. If the input shaft 70 has low modulus of elasticity, its angular elasticity limits this flaw, but does not eliminate it. The most practicable way to eliminate the flaw is to make large holes 84 in the brace gears 82 near the output end, so that the brace gears 82 near the output end can be rotated by the torque transmitted by the ring gears 80.

FIG. 14 illustrates different sizes of the holes 84, but it does not mean that the holes 84 made in the same brace gear 82 have different size. All the four holes 84 made in the same brace gear 82 have the same size, but every brace gear 82 has different size of the holes 84. The smallest holes 84 are at the input end. The biggest holes 84 are at the output end. Adjacent brace gears 82 have the holes 84 of similar size.

The edges of the output shaft 72 are elastic due to axial holes 92 made in the shafts. The elastic edges are necessary to maximize the interface area between the output shaft 72 and the cycloidal gears 76. Filling the holes 92 with the polyoxymethylene plastic is advantageous because the plastic reinforces the edges of the output shaft 72. The best tool for making the output shaft 72 is an electrical discharge cutter.

The cycloidal speed reducer shown in FIGS. 14-18 is smaller and more lightweight than prior art cycloidal speed reducers having the same torque rating. Possible applications include speed reducers that provide large torques for robots and for rotors of helicopters.

Figure 19:
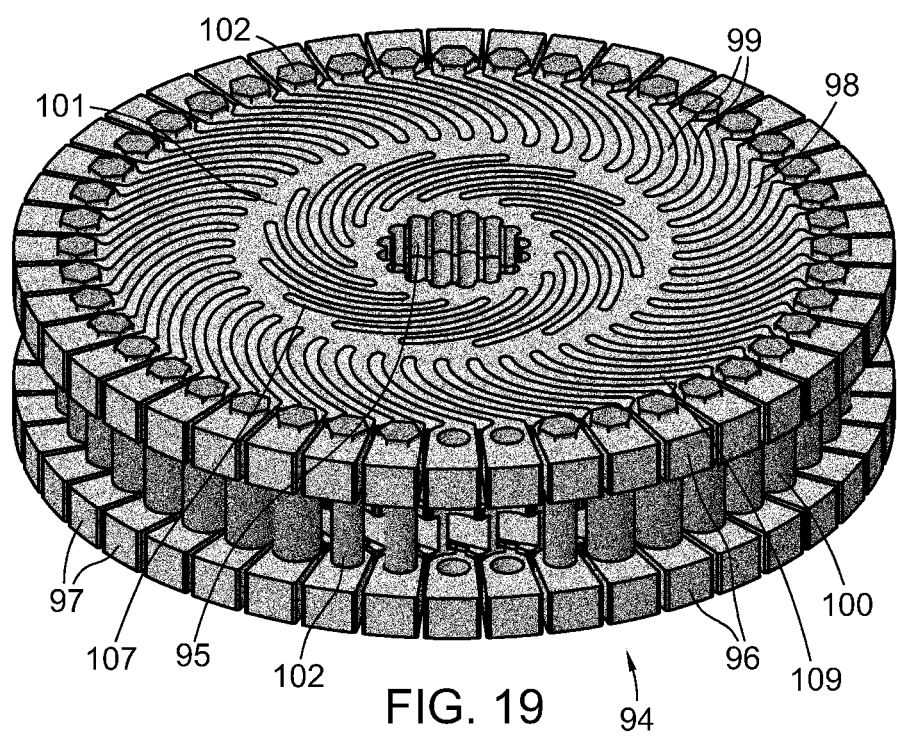
FIG. 19 is a perspective view of a rail wheel configured as a pinion and incorporating the invention.
Figure 21:
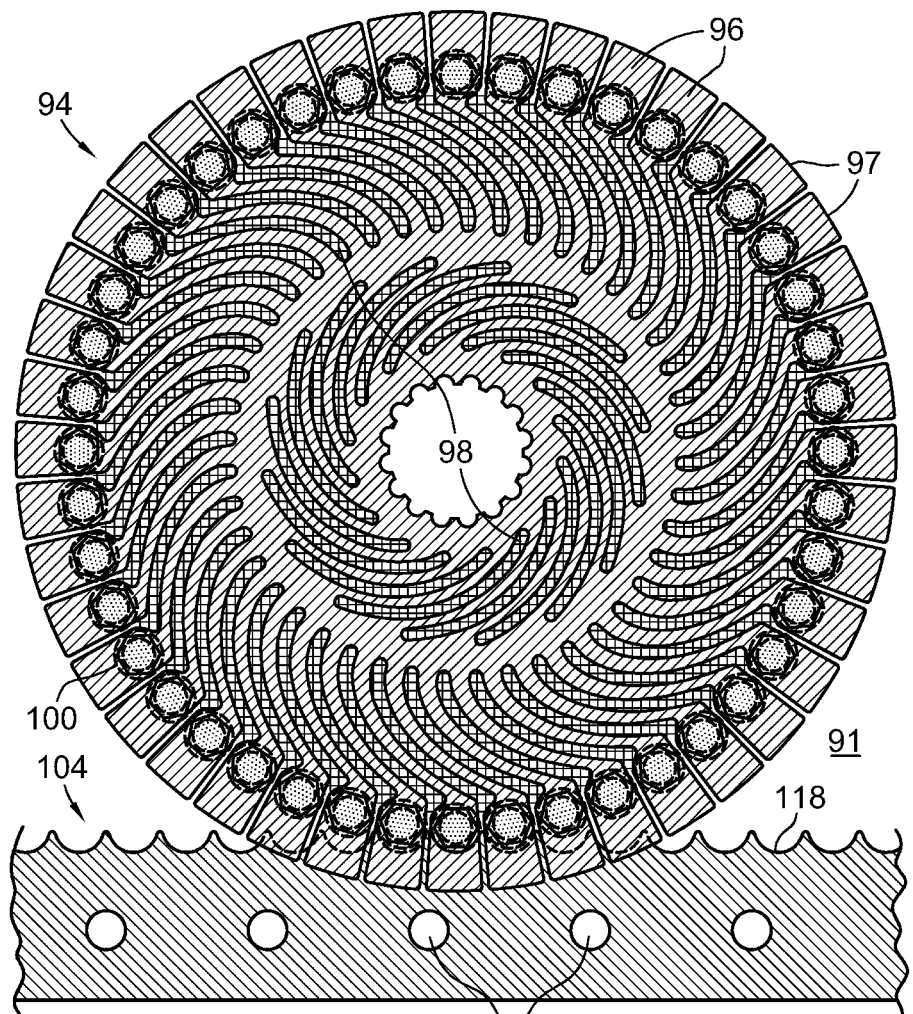
FIG. 21 is a side view of a rail and wheel configured as a rack and pinion to provide traction and support for the driving engine and support for the cars of a railroad train.

The perspective view in FIG. 19 shows an assembled wheel pinion 94 for use with a rack 104 such as FIG. 21 shows. Wheel pinion 94 comprises plates 96, a spacer element 98, rollers 100, and bolts 102. In this embodiment, rollers 100 function as teeth for wheel pinion 94.

The plates 96 are made of spring steel and have flexible spiral arms 99 projecting from and integral with a central hub 101. Each arm 99 carries a sector 97 at the end thereof. Sectors 97 on plates 96 extend past the adjacent roller 100 to collectively form two peripheral flanges on first and second sides of wheel 94. These peripheral flanges serve to hold wheel 94 on rack 104. The portion of wheel pinion 94 nearest to the viewer has two bolts 102 from which rollers 100 have been removed, and two sectors 97 having neither bolts 102 nor rollers 100.

Hub 101 has a shaft mounting hole 95 and around hole 95, a series of overlapping spiral slots. These slots define the arms 99 that provide radial and tangential flexibility for wheel 94.

Figure 20:
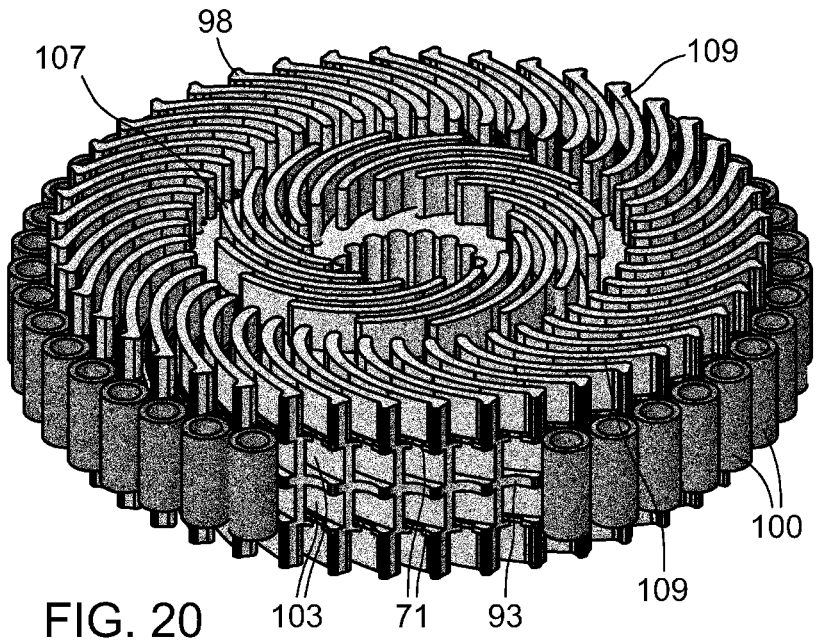
FIG. 20 is a perspective view of a spacer for use in the rail wheel shown in FIG. 19.

FIG. 20 is a perspective view of spacer element 98 with rollers 100 positioned approximately with respect to element 98 as in an assembled wheel pinion 94. Note that rollers 100 are not integral with either spacer element 98 or arms 99.

Spacer element 98 has a central base 93 in the form of a disk or plate. Curved spacer projections 109 integral with base 93 extend perpendicularly from both sides of base 93. Spacer element 98 preferably comprises polyoxymethylene plastic because this material has high coefficient of restitution, low coefficient of friction, rather low creep, and can be molded into the very complex shape of spacer 98.

The shapes and positions of spacer projections 109 allow them to fit within the slots between pairs of arms 99. Curved filler projections 107 extend vertically from both sides of base 93 with shapes and positions that allow them to fit within the spiral slots surrounding mounting hole 95. Because of the many mating surfaces, it is best if the spacer element 98 comprises a plastic that can be molded with relatively high precision.

In the cutaway portion of FIG. 20, the individual spacer projections 109 themselves are seen to have flanges 71 projecting from the sides thereof. Adjacent spacer projections 109 have a curved gap 103 between them to allow independent flexing. Plates 96 press against flanges 71 in an assembled wheel pinion 94. These flanges 71 axially position and maintain the plates 96 in spaced relationship with respect to base 93 and each other in an assembled wheel pinion 94. The length of rollers 100 is slightly less than the spacing between an outer surface of a flange 71 on one side of base 93 and the outer surface of the similar flange 71 in axial alignment on the other side of base 93.

In use, arms 99 flex elastically when absorbing both torques and radially directed shocks. Spacer projections 109 serve to distribute load among arms 99 as wheel pinion 94 receives torque and shocks causing arms 99 to flex.

The contact surface between the rollers 100 and the bolts 102 may be lubricated to reduce the rolling friction of wheel pinion 94 on rail 104. For example, sintered metal bushings permeated with lubricant may be interposed between the bolts 102 and the rollers 100. Rotation of rollers 100 during use allows different areas of rollers 100 to contact rack 104, reducing wear on rollers 100.

The gaps 103 present between projections 109 and between flanges 71 thereon and base 93 prevent arms 99 from rubbing on base 93 while wheel pinion 94 is in use. Arms 99 can flex as required by distorting projections 109 in the area of gaps 103. The thickness of the portions of projections 109 defining gaps 103 must be great enough to support the compressive loads on plates 96 created by bolts 102.

One suitable way to form plates 96 is to cut their peripheries and arms 99 from a steel plate with a laser, followed by electrochemical deburring. One way to form the grooves 118 on the top surface of the rail 104 is to cut a steel plate with a plasma cutter before electrochemical deburring. This fabrication method is not very precise, but high precision is unnecessary because wheel 94 is compliant.

Assembling a wheel pinion 94 includes slipping two plates 96 onto the projections 107 and 109 on opposite sides of spacer 98. A bolt 102 passes through a hole in one sector 97 on one plate 96, through a roller 100, and through an aligned hole in one sector 97 of the other plate 96. As the bolts 100 are tightened, plates 96 draw up against flanges 71 on projections 109. Flanges 71 hold plates 96 sufficiently spaced from each other, to allow rollers 100 to rotate freely in an assembled wheel 94.

If of appropriate size, pinion 94 may serve as a wheel for a railroad car that is capable of providing both load support and traction. Each of the load-bearing tracks for such a wheel is in the form of a rack 104 that cooperates with the pinion 94 in providing motive force for the car. Such racks 94 may extend as a pair of tracks for hundreds of kilometers.

The general structure described above for gears with deflecting cantilevered arms carrying teeth on their ends is suitable for wheel pinion 94. One or the other of wheel pinion 94 and rack 104 should have resiliency. Preferably the resiliency is placed in wheel pinions 94 because then only 100-200 teeth per rail car need have the relatively expensive features that provide the resiliency.

The structure of these wheel pinions 94 provide the advantage of low noise and large interface area between the wheels and the rails compared to existing rail wheels. The large interface area reduces the Hertzian contact stress, so the size of the rails and the wheels may be smaller. Traction is very good even in the presence of moisture, grease, snow, ice, and leaves on the rail surface.

FIG. 21 is a side elevation view the invention configured as a rack and pinion set 91 comprising a rack 104 and a wheel pinion 94. Wheel pinion 94 has resilient arms 99, with individual teeth comprising rollers 100 mounted on arms 99 that deflect under both axial and tangential load. Rollers 100 engage transverse grooves 118 in rack 104 that match the pitch of rollers 100. Each groove 118 has a circularly cylindrical cross section matching the external diameter of rollers 100.

The prior art rack-and-pinion railway tracks comprise two smooth rails and a separate rack between them. The railway track of this embodiment has instead two rails in the form of a series of racks 104 in an aligned end to end configuration.

Figure 22:
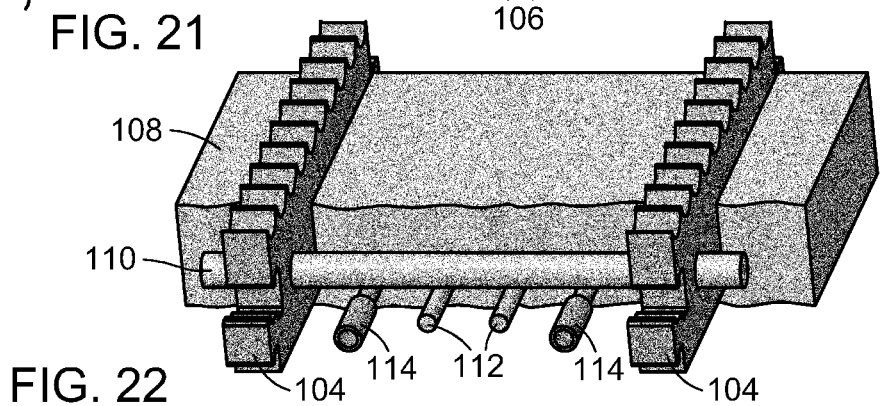
FIG. 22 is a perspective view of a prefabricated segment of a rail track shown in FIG. 21.

FIG. 22 shows a concrete slab 108 and steel retainer rods 110 that fit in holes 106 to tie racks 104 to slab 108. In FIG. 22 a portion of a prefabricated segment of two racks 104 are configured as the two rails of a railway track. Slab 108 evenly distributes the weight of the trains over a large area of the soil below. Part of the slab 108 is omitted to show one of the retainer rods 110 that fits through the holes 106 in rack 104 shown in FIG. 21. Alignment rods 112 protrude from both ends of the concrete slab 108 to maintain alignment of slabs 108. Short sleeves 114 join the ends of the alignment rods 112. Protrusions on the bottom surface of the concrete slab 108 enhance friction between the slab and the soil beneath the slab 108.

Figure 23:
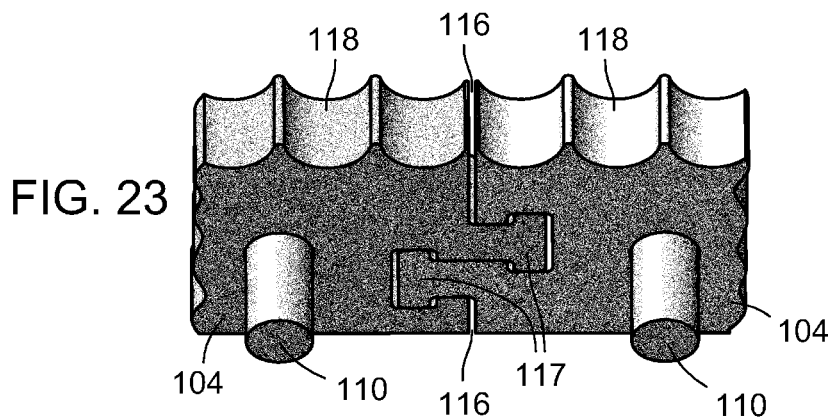
FIG. 23 is a perspective view of a connection joint between the two prefabricated rail track segments and incorporating tolerance for thermal expansion.

FIG. 23 shows a perspective view of the expansion joint between the racks 104 with slab 108 and reinforcement rods 112 omitted. Individual rail sections 104 are fastened together with tongue and groove assemblies 117. Assemblies 117 have dimensional tolerances built in to simplify assembly and to accommodate thermal expansion.

Most of the noise and shock made by the prior art wheels occurs when the wheels hit the expansion joint gaps between adjoining rail segments. The expansion joint of this embodiment makes little noise because gap 116 is between grooves 118 so that no part of wheel 94 touches gap 116. The rollers 100 touch only the cylindrical grooves 118 in the racks 104.

Quiet expansion joints make it practicable to prefabricate racks 104 in short segments to form a rail track. The length of the segments may be on the order of two meters which is a fraction of the length of prior art rail segments. The segments are preferably on the order of about two meters so that teeth of the wheel 94 need only conform to small changes in the size of gap 116. Such gap 116 changes arise in most part because of thermal expansion of the racks 104.

It is possible that small pieces of debris made of hard materials such as steel may cause damage to wheels 94. An electromagnet placed in front of the wheel 94 can remove this type of debris. This problem exists for prior art rack and pinion railways as well.

Figure 24:
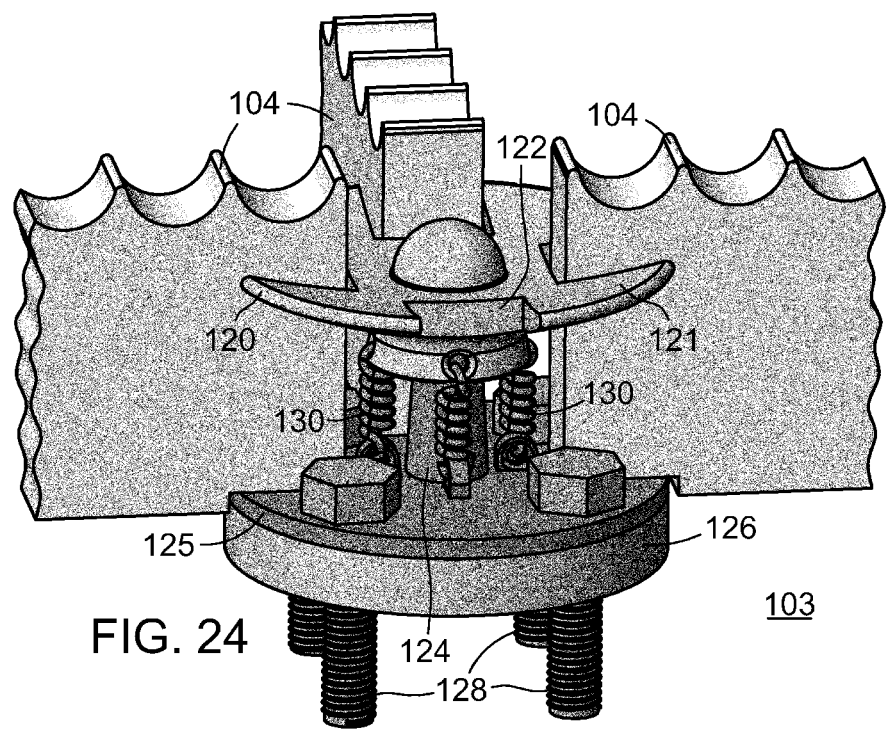
FIG. 24 is a perspective view of a rail crossing junction compatible with the track segments of FIG. 23.
Figure 25:
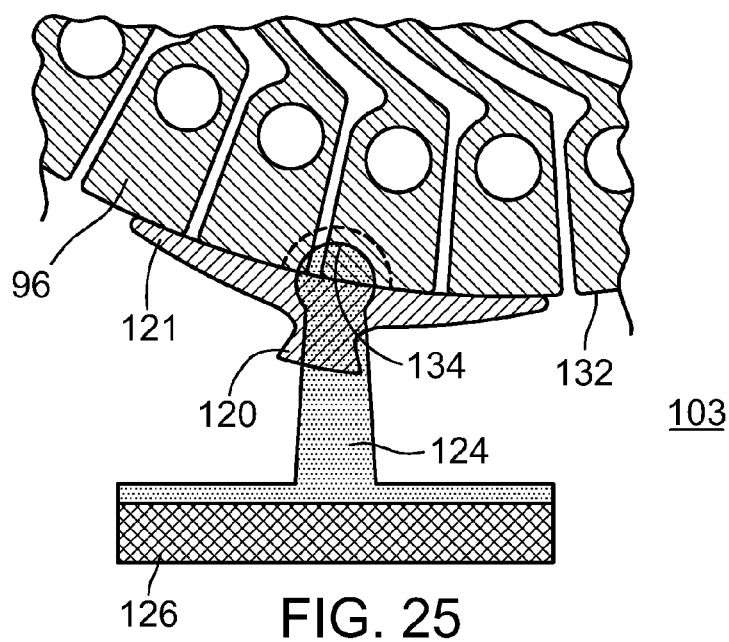
FIG. 25 is a vertical section through the rail crossing junction of FIG. 24, including a part of the wheel of FIG. 19.

FIGS. 24 and 25 show a simple rail crossing junction 103 comprising four racks 104. Junction 103 is suitable for street-car tracks. Two pairs of racks 104 with each pair of racks in substantial end to end alignment as shown for one pair form a crossing of two rails in junction 103. One of four racks 104 has been omitted from FIG. 24 to reveal the internal structure of junction 103. The spacing between the ends of two aligned racks 104 in a junction 103 should allow wheel pinions 94 to pass through a junction 103 with adequate clearance with the racks 104 forming the crossing rail.

A hat-shaped junction structure 120 in each junction 103 supports a wheel 94 passing through the junction 103. The top part of structure 120 has four identical recesses 122 that accept ends of four racks 104 and provide for proper spacing of aligned rack 104 ends forming a part of the same track. Four pie-shaped, curved arms 121 integral with structure 120 project from a center area of structure 120 and along each side of each of the four rail segments 104. A structure 120 must be strong enough to support a fully loaded wheel pinion 94.

Structure 120 rests on a post 124, which projects upwardly from a baseplate 125. The interface 134 (shown in FIG. 25) between structure 120 and the post 124 is a ball-and-socket-joint, so the structure 120 can tilt in any direction. Four coil springs 130 connected between baseplate 125 and structure 120 hold structure 120 firmly on post 124. When no wheel pinions 94 are present, springs 130 maintain an approximately horizontal orientation for structure 120 as shown in FIG. 24.

Baseplate 125 rests on a pad 126 made of the polyoxymethylene plastic or similar material that cushions the shock as plates 96 strike structure 120. In one embodiment, baseplate 126 rests on the edges of four slabs 108 and is held in place by four bolts 128.

FIG. 25 is a section view of a junction 103 with a wheel pinion 94 passing through. As a wheel pinion 94 rolls through junction 103, racks 104 no longer contact the rollers 100 on wheel pinion 94. The weight normally supported by rollers 100 and racks 104 transfers briefly to plates 96 and arms 121 of structure 120. Arms 121 have in the areas over which plates 96 pass, an upwardly facing spherical curvature matching that of the plates 96 peripheries.

Springs 130 maintain the angular orientation of structure 120 in a substantially horizontal orientation when no wheel pinion 94 is present. Plates 96 of a wheel pinion 94 entering junction 103 cause structure 120 to tilt on post 124 first one way as shown in FIG. 25, and then the other as a wheel pinion 94 passes through junction 103. The Hertzian contact stress between the plates 96 and arms 121 is low because the curvature of plate periphery 132 matches the contact surface curvature of arms 121 on structure 120.

A wheel pinion 94 passing through a junction 103 experiences a slight jolt because of the curvature in arms 121. A car that wheel pinion 94 supports preferably passes through junction 103 at reduced speed because junction 103 has some inherent unevenness.

Figure 26:
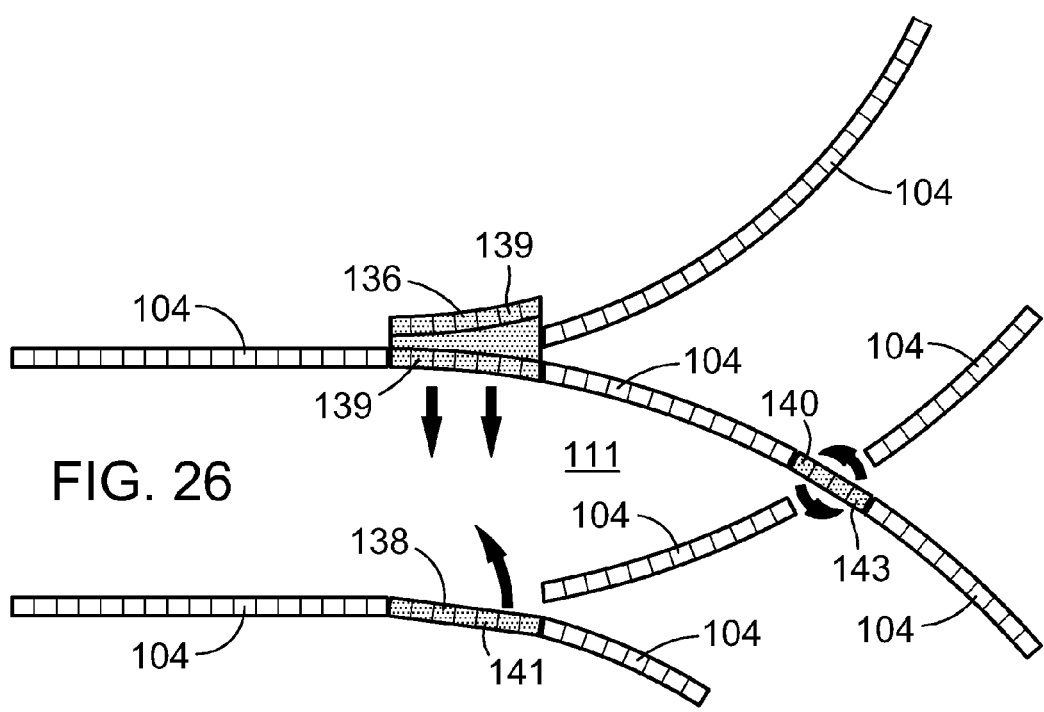
FIG. 26 is a plan view of three types of railroad switches suitable for use with the rail track of FIG. 22.

FIG. 26 is a plan view of a railroad switch 111 for directing trains and streetcars to one of two diverging rail tracks. It has three kinds of rail switches 136, 138, and 140 each indicated with shading. A train is guided to a different rail track by moving the rail switches 136, 138, and 140 as shown by the arrows.

Switch 136 comprises two short, curved rack sections 139 that can shift transversely relative to the adjoining racks 104 to connect the adjoining rack sections 104. Since sections 139 accurately fill the gap between the two adjoining rack sections 104 and closely match the curvature of the adjoining sections 104, trains need not slow down much if at all.

Switch 138 comprises a single short, straight rack section 141. Since section 141 does not closely match the curvature of adjoining rack sections 104, trains must slow down substantially.

Switch 140 comprises a single short, straight rack section 143 that rotates to fill one or the other of two gaps between adjoining pairs of racks 104. Again, since section 143 is straight, trains must slow down to some extent. Since crossing tracks often have nearly straight sections near the point of crossing, the curvature match for section 143 may be quite close to that of the adjoining racks 104, meaning that trains need not slow down as much as for switch 138.

What I claim as my invention is:

1. A first gear for use in a gear set including a second gear, said first and second gears for transferring torque between them, said first gear comprising:
   a) a hub having an axis and a periphery;
   b) a plurality of curved arms each made of an elastic material, each curved arm having a first end attached to the hub's periphery at a preselected attachment point and a second end coinciding with a line lying in a gear plane perpendicular to the axis and passing through the attachment point, said line making an acute arm angle with a radius line extending from the axis in the gear plane and through the attachment point, said curved arms extending around the entire periphery of the hub, each pair of adjacent curved arms defining a slot between them, said curved arms having a dimension in the gear plane allowing elastic deflection of the curved arms in the gear plane as a cantilevered beam into the slot;
   c) at the second end of each curved arm, a tooth for meshing with a tooth on the second gear to allow transfer of force between the first gear's tooth and the meshing second gear's tooth; and
   d) at least one load distributor contacting a second arm and at least a first of the arms defining the slot, each said load distributor for distributing to the second arm at least a portion of force applied to the tooth on the first of the arms and wherein said load distributor includes a material having a high coefficient of restitution.

2. The first gear of claim 1, wherein the curved arms are integral with the hub.

3. The first gear of claim 2, wherein the curved arms have similar shapes in the gear plane.

4. The first gear of claim 3, wherein the load distributors comprise inserts within at least some of the slots.

5. The first gear of claim 4, wherein the inserts are flexible and substantially fill their respective slots.

6. The first gear of claim 4, wherein the inserts each comprise a material that is at least one of substantially softer and substantially more flexible than the material comprising the curved arm.

7. The first gear of claim 2, wherein the inserts occupy a portion of their respective slots.

8. The first gear of claim 4, wherein the inserts occupy a portion of their respective slots adjacent to the curved arm's second end.

9. The first gear of claim 1, wherein said load distributor includes a fiber wrapped through a first slot and through a nonadjacent second slot.

10. The first gear of claim 9, wherein said fiber is wrapped through the first and second slots for a multiple number of times.

11. The first gear of claim 1 wherein the tooth is a separate structure carried on an end of the curved arm.

12. The first gear of claim 1, wherein the curved arm is integral with both the hub and the tooth.

13. The first gear of claim 12, wherein at least one first curved arm has a dimension perpendicular to the gear plane that is substantially greater than the arm's transverse dimension in the gear plane.

14. The first gear of claim 1, wherein at least one first curved arm has a dimension perpendicular to the gear plane that is substantially greater than the first curved arm's dimension in the gear plane.

15. The first gear of claim 1, wherein the curved arm comprises a stub arm from which project a pair of arm extensions.

16. The first gear of claim 15, wherein the stub arm projects from the hub at a stub arm angle with respect to a radius, and the arm extensions project from the stub arm at an angle different from the stub arm angle.

17. The first gear of claim 1, and including a complementary second gear for meshing with and transferring torque between the first and second gears, said second gear having a)
a hub having an axis and a periphery, and a plurality of first attachment features around the periphery thereof;
   b) a ring having inner and outer peripheries, and on the outer periphery thereof, a plurality of teeth matching the first gear's teeth, and on the interior periphery, a plurality of second attachment features; and
   c) an elastic strand connecting each of the first attachment features to at least one of the second attachment features, to support the hub within and in spaced relation to the ring.

18. The first gear of claim 1, wherein the curved arms comprise sintered material.

19. The first gear of claim 18, wherein the teeth comprise hardened sintered material.

20. The first gear of claim 1, wherein a tooth comprises a roller mounted for rotation on the curved arm, and having peripheral flanges on first and second sides of the gear, and extending past the tooth.

21. The first gear of claim 20, including a pair of plates each formed to provide a plurality of curved arms having slots between adjacent arms, a spacer element having spacer projections extending into the slots between adjacent curved arms, said spacer projections having flanges thereon for supporting the plates in spaced apart relationship.

22. The gear of claim 1 wherein said load distributor includes at least one of a metal, a metal alloy, or a plastic.

23. The gear of claim 1 wherein said load distributor includes polyoxymethylene plastic.

\* \* \* \* \*

UNITED STATES PATENT AND TRADEMARK OFFICE
CERTIFICATE OF CORRECTION

PATENT NO. : 8,468,904 B2
APPLICATION NO. : 12/921691
DATED : June 25, 2013
INVENTOR(S) : Andrew Nowicki Page 1 of 1

It is certified that error appears in the above-identified patent and that said Letters Patent is hereby corrected as shown below:

On the title page, in column 2, under "Other Publications", line 1, delete "09719238.9 ," and insert --09719238.9,--, therefor In the Claims In column 13, line 2, in Claim 3, after "similar", insert --arcuate--, therefor.

In column 14, line 3, in Claim 17, after "having", insert --¶--, therefor

Signed and Sealed this
Third Day of December, 2013

Margaret A. Focarino
*Commissioner for Patents of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 8,468,904 B2 | |
| APPLICATION NO. | : 12/921691 | |
| DATED | : June 25, 2013 | |
| INVENTOR(S) | : Andrew Nowicki | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 103 days.

Signed and Sealed this
Eighteenth Day of March, 2014

Michelle K. Lee
*Deputy Director of the United States Patent and Trademark Office*